United States Patent
Hady et al.

(10) Patent No.: US 8,402,222 B2
(45) Date of Patent: *Mar. 19, 2013

(54) CACHING FOR HETEROGENEOUS PROCESSORS

(75) Inventors: Frank T. Hady, Portland, OR (US); Mason B. Cabot, San Francisco, CA (US); John Beck, Northboro, MA (US); Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,798

(22) Filed: Feb. 27, 2012

(65) Prior Publication Data

US 2012/0215984 A1 Aug. 23, 2012

Related U.S. Application Data (63) Continuation of application No. 12/459,683, filed on Jul. 6, 2009, now Pat. No. 8,156,285, which is a continuation of application No. 11/270,932, filed on Nov. 10, 2005, now Pat. No. 7,577,792, which is a continuation of application No. 10/993,757, filed on Nov. 19, 2004, now abandoned.

(51) Int. Cl.
*G06F 12/00* (2006.01)

(52) U.S. Cl. ......................................... 711/130

(58) Field of Classification Search .................. None
See application file for complete search history.

(56) References Cited

U.S. PATENT DOCUMENTS

| | | | |
|---|---|---|---|
| 5,247,649 | A | 9/1993 | Bandoh |
| 5,761,516 | A | 6/1998 | Rostoker et al. |
| 5,875,470 | A | 2/1999 | Dreibelbis et al. |
| 5,895,487 | A | 4/1999 | Boyd et al. |
| 5,898,892 | A | 4/1999 | Gulick et al. |
| 5,987,587 | A | 11/1999 | Meltzer |
| 6,055,605 | A | 4/2000 | Sharma et al. |
| 6,801,207 | B1 | 10/2004 | Tischler et al. |
| 6,801,208 | B2 | 10/2004 | Keshava et al. |
| 7,023,445 | B1 | 4/2006 | Sell |
| 7,055,060 | B2 | 5/2006 | Nguyen et al. |
| 7,086,058 | B2 | 8/2006 | Luick |
| 7,093,080 | B2 | 8/2006 | Day et al. |
| 7,136,967 | B2 | 11/2006 | Sawdey |
| 7,143,401 | B2 | 11/2006 | Babaian et al. |
| 7,219,185 | B2 | 5/2007 | Luick |
| 7,577,792 | B2 | 8/2009 | Hady et al. |
| 8,156,285 | B2 * | 4/2012 | Hady et al. .................. 711/130 |
| 2001/0042189 | A1 | 11/2001 | Babaian et al. |
| 2003/0018860 | A1 | 1/2003 | Krueger |
| 2003/0069939 | A1 | 4/2003 | Russell |
| 2004/0024821 | A1 | 2/2004 | Hady |
| 2005/0013705 | A1 | 1/2005 | Farkas et al. |
| 2006/0041715 | A1 | 2/2006 | Chrysos et al. |

FOREIGN PATENT DOCUMENTS

| | | |
|---|---|---|
| CN | 87100507 A | 11/1987 |
| EP | 0817096 A2 | 1/1998 |
| WO | 02/25447 A2 | 3/2002 |
| WO | 2006/055477 A1 | 5/2006 |

OTHER PUBLICATIONS

International Search Report and Written Opinion received for PCT Application No. PCT/US2005/041166, mailed on Feb. 23, 2006, 7 pages.

Office Action received for German Patent Application No. 112005002364.8, mailed on Apr. 17, 2008, 5 pages.

(Continued)

*Primary Examiner* — Hiep Nguyen (57) ABSTRACT

A multi-core processor providing heterogeneous processor cores and a shared cache is presented.

24 Claims, 7 Drawing Sheets

OTHER PUBLICATIONS

Huang, G.-Q., "Shared Multi-Ported Data Cache Architecture: SMPDCA Author", Chinese Journal of Computers—Chinese Edition, 2001, vol. 24, Part 12, Publisher Science Press China ISSN 0254-4164, pp. 1318-1323.

International Preliminary Report on Patentability for PCT Application No. PCT/US2005/041166, mailed on May 31, 2007, 7 pages.

Office Action Received for Chinese Patent Application No. 200510023015.0, mailed on Apr. 20, 2007, 8 pages of English Translation.

Office Action Received for Chinese Patent Application No. 200510023015.0, mailed on Dec. 28, 2007, 10 pages of English Translation.

Office Action Received for Chinese Patent Application No. 200510023015.0, mailed on Sep. 27, 2008, 4 pages of English Translation.

Office Action Received for Chinese Patent Application No. 200810186367.1, mailed on Aug. 17, 2010, 4 pages of English Translation.

Office Action Received for U.S. Appl. No. 10/993,757, mailed on Jun. 4, 2007, 12 pages.

Office Action Received for U.S. Appl. No. 11/270,932, mailed on Jun. 4, 2007, 12 pages.

Office Action Received for U.S. Appl. No. 11/270,932, mailed on Nov. 28, 2007, 7 pages.

Office Action Received for U.S. Appl. No. 11/270,932, mailed on Jul. 16, 2008, 9 pages.

Office Action Received for U.S. Appl. No. 11/270,932, mailed on Jan. 6, 2009, 6 pages.

Office Action Received for U.S. Appl. No. 12/459,683, mailed on Aug. 30, 2010, 11 pages.

Office Action Received for U.S. Appl. No. 12/459,683, mailed on Feb. 17, 2011, 9 pages.

Office Action Received for U.S. Appl. No. 12/459,683, mailed on Aug. 5, 2011, 6 pages.

Office Action received for German Patent Application No. 112005002364.8, mailed on Apr. 13, 2012, 14 pages of Office action and 9 pages of English translation.

* cited by examiner

CACHING FOR HETEROGENEOUS PROCESSORS

This U.S. patent application is a continuation of U.S. patent application Ser. No. 12/459,683 filed Jul. 6, 2009 which is a continuation of U.S. patent application Ser. No. 11/270,932 filed Nov. 10, 2005 which is a continuation of U.S. patent application Ser. No. 10/993,757 filed Nov. 19, 2004.

BACKGROUND

Modern general purpose processors often access main memory (typically implemented as dynamic random access memory, or "DRAM") through a hierarchy of one or more caches (e.g., L1 and L2 caches). Relative to main memory, caches (typically static random access memory, or "SRAM", based) return data more quickly, but use more area and power. Memory accesses by general purpose processors usually display high temporal and spatial locality. Caches capitalize on this locality by fetching data from main memory in larger chunks than requested (spatial locality) and holding onto the data for a period of time even after the processor has used that data (temporal locality). This behavior often allows requests to be served very rapidly from cache, rather than more slowly from DRAM. Caches also generally can satisfy a much higher read/write load (for higher throughput) than main memory so previous accesses are less likely to be queued and slow current accesses.

Computational workloads like networking and graphics are often performed better on special purpose processors designed specifically for the given workload. Examples of such special purpose processors include network processors and graphics accelerators. In general these special purpose processors are placed outside of the general purpose processor's caching hierarchy, often on a Peripheral Component Interconnect (PCI) or Accelerated Graphics Port (AGP).

Memory accesses by the special purpose processor therefore involve only main memory, not the cache of the general purpose processor. Moving data between the general purpose processor and the special purpose processor often requires both a main memory write and a main memory read, so such a transfer can proceed at only DRAM speeds.

DETAILED DESCRIPTION

Figure 1A:
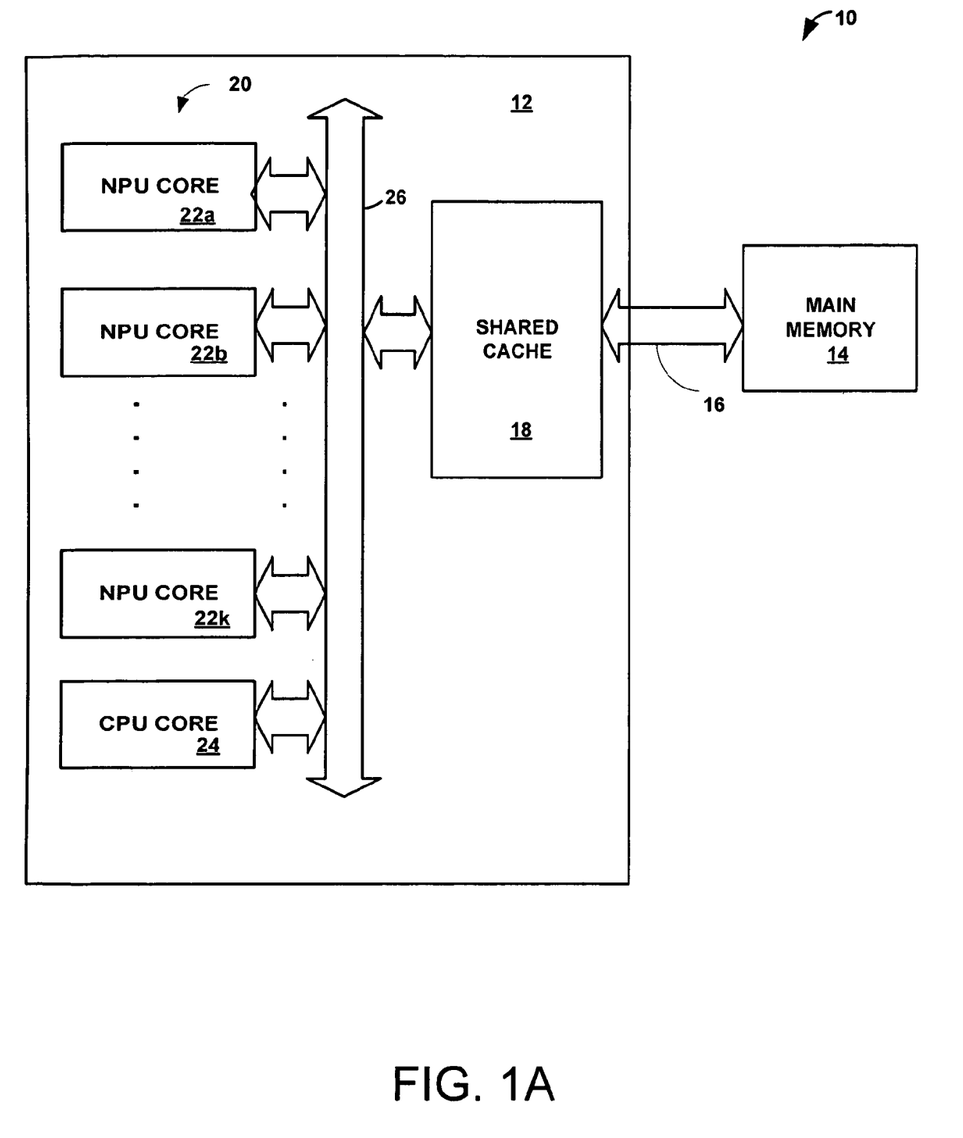
FIGS. 1A-1C show an exemplary heterogeneous multi-core processor having a bus-based shared cache architecture.
Figure 1B:
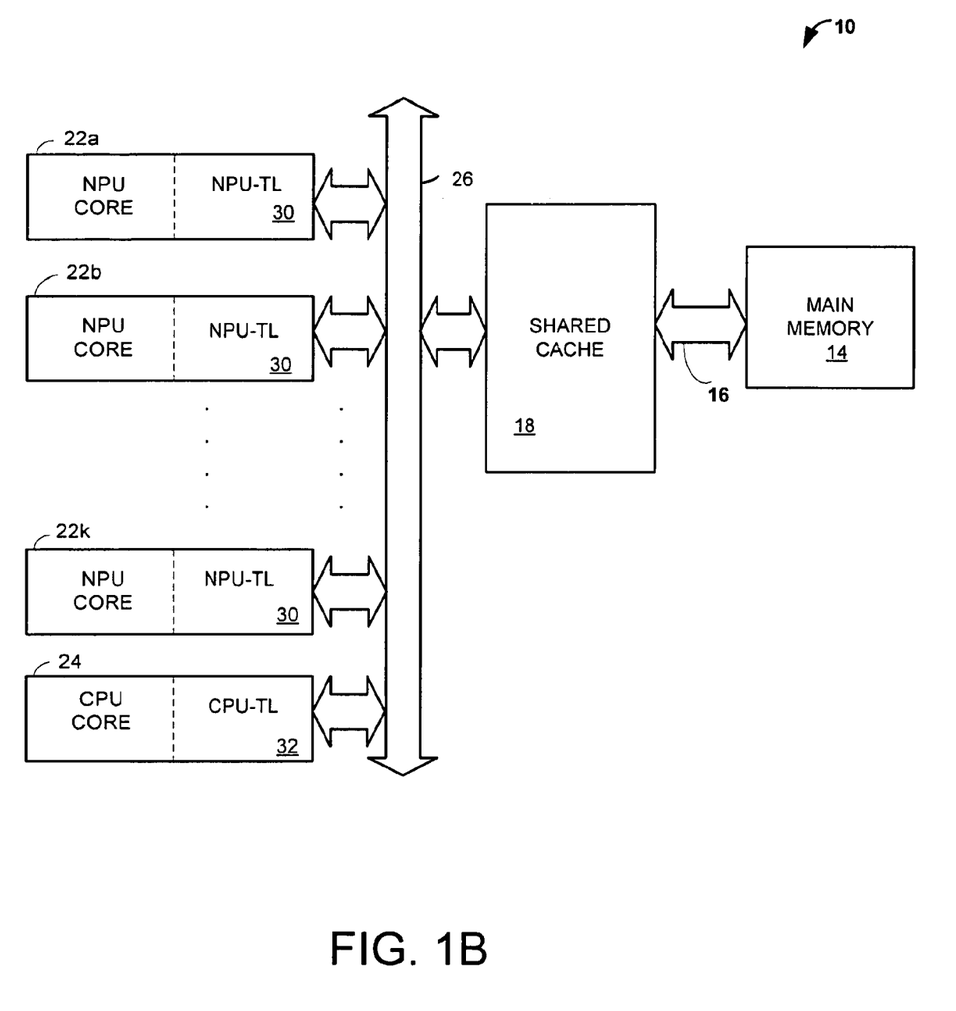
Figure 1C:
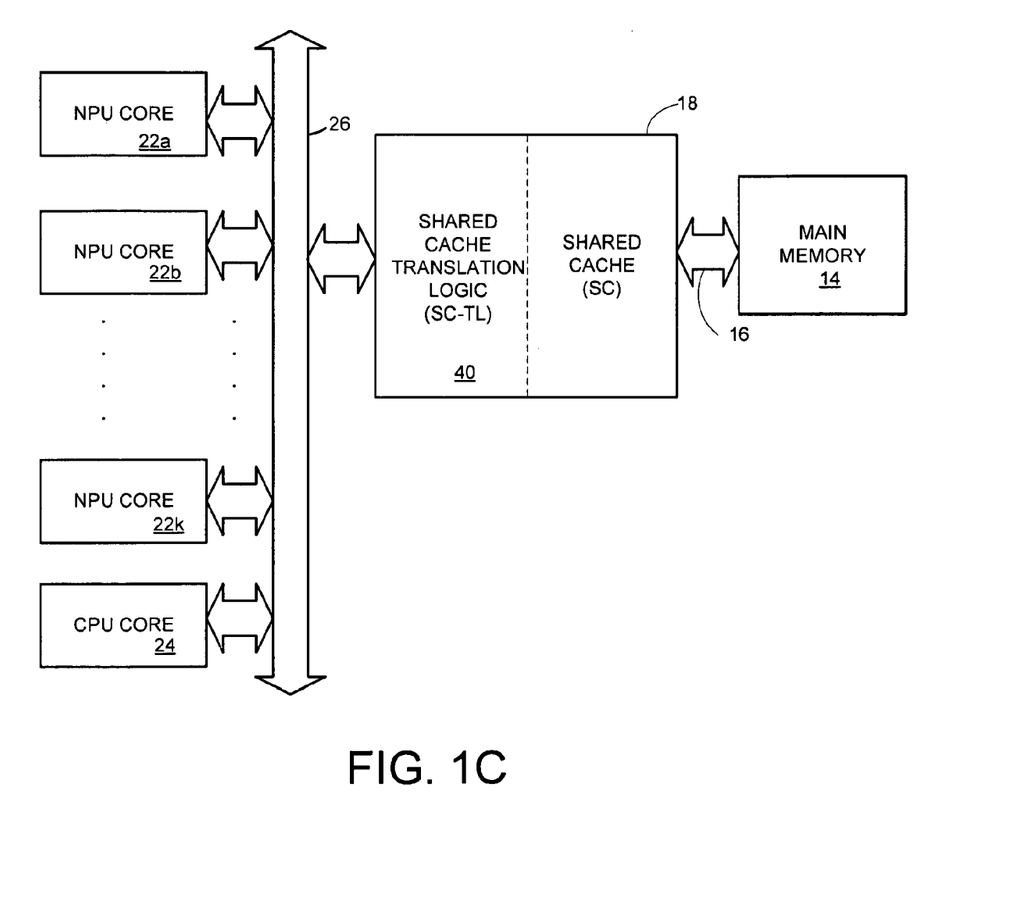

FIGS. 1A-1C show a multi-processor system 10 that includes a multi-processor 12 coupled to a main memory 14 by a memory bus 16. The multi-processor 12 includes a cache ("shared cache") 18 and multiple processor "cores" (collectively, processor cores 20) that are connected to and share the cache 18. The shared cache 18 in this figure is intended to represent a unit that includes both cache memory and associated control logic. The cache control logic includes logic to map memory addresses ("cache tags") currently cached with their associated cache lines.

The processor cores 20 include heterogeneous cores, that is, architecturally different processor cores (or types of processor cores). For example, the processor cores 20 may include one or more special purpose processor cores and/or at least one central processing unit (CPU) core.

The special purpose processor cores may include, for example, at least one network processor unit (NPU) core and/or a graphics engine core. In the illustrated embodiment, the processor cores 20 include multiple NPU cores, shown as NPU cores 22a, 22b, ..., 22k, as well as a CPU core 24. The NPU cores 22 may be programmble Reduced Instruction Set Computing (RISC) cores that feature hardware support for multi-threaded operation. The NPU cores 22 may lack instructions typically found in other processors such as integer multiplication or division or floating point operations since these operation occur relatively infrequently in processing network packets. The CPU core 24 may be based on the architecture of any type of general purpose processors, e.g., an Intel® Architecture processor ("IA processor") such as the Intel® Xeon™ processor, or the Intel Pentium® 4 processor or Xscale™ processor.

Although not shown, it may be appreciated that the CPU core 24 may use a private cache (e.g., the private cache may be an L1 cache and the shared cache may be an L2 cache) as well.

The processor cores 20 are connected to the shared cache 18 via some type of interconnect mechanism, e.g., a shared bus 26, as shown. Accesses by both the CPU core 24 and the NPU core 22 may be serviced from the cache 18 (if the data is present there) very rapidly. Such an access is called a cache hit, meaning the data is returned more quickly. A cache hit also decreases the number of accesses to main memory 14, increasing the rate with which other accesses (cache misses or access from I/O agents) can be serviced. Data used by both types of processor cores 22, 24 can be accessed very rapidly from the shared cache 18, without the need for DRAM or even cache-to-cache transfers. Data can be passed from one processor core (say, the NPU core 22) to another processor core (say, the CPU core 24) through cache reads and writes, enabling such processor cores to proceed at a faster rate and without loading the main memory 14.

Passing of data between the two processor core types can be accomplished with the shared cache in the following way. The processor core with the data writes it to cache. This same processor core informs the other processor core that the data is ready (e.g., through an interrupt or flag update). The second processor core may then read the data, pulling it directly from the shared cache 18. The data passed between the processor cores need not be written to or read from the main memory 14. The two types of processor cores can, therefore, pass data in such a manner at the data rate of the shared cache, which is often much higher than that allowed by main memory, and without loading the main memory with avoidable DRAM reads and writes.

The close coupling of the NPU core 22 and the CPU core 24 allows these cores to collaborate on specific networking algorithms (like Intrusion Detection, Firewalling, Secure Sockets Layer (SSL) acceleration, for example) in a more fine-grained manner. The shared cache allows migration of related work (and state) from one core to another without the use of DRAM.

Although not shown, it will be appreciated that one or more of the NPU cores 22 could be coupled to other resources, in particular, an interface (or interfaces) to external network devices. Such external media devices may be any media interface capable of transmitting and/or receiving network traffic data, such as framing/media access control (MAC) devices, e.g., for connecting to 10/100BaseT Ethernet, Gigabit Ethernet, Asynchronous Transfer Mode (ATM) or other types of networks, or interfaces for connecting to a switch fabric. For example, in one arrangement, one network device could be an Ethernet MAC device (connected to an Ethernet network) that transmits data to or receives data from the processor 12, and a second network device could be a switch fabric interface to support communications to and from a switch fabric. Other NPU resources may include, for example, control status registers (CSRs), interfaces to other external memories, such as packet buffer and control memories, and scratch memory.

In contrast with conventional systems, in which the special purpose processors are on separate silicon and are placed on the I/O connectors of a general purpose processor (e.g., host) system, the core(s) of the multi-processor 12 are integrated onto the same die as the CPU core 24 and, potentially, cache 18. Such integration allows the heterogeneous cores the opportunity to more efficiently share data as they are placed behind a common cache. Thus, in one embodiment, as illustrated in the figures, the processor cores, cache and interconnect reside on a single chip. Alternatively, the processor cores 20, cache 18 and interconnect 26 may be implemented as separate chips in a multi-chip package. In yet another alternative embodiment, the processor cores 20, cache 18, and interconnect 26 may be implemented as a combination of chip and board design.

FIGS. 1B-1C show further details of the bus-based cache architecture, according to exemplary embodiments. In FIG. 1B, each of the NPU cores 22 includes NPU core translation logic (NPU-TL) 30 and the CPU core 24 includes CPU core translation logic (CPU-TL) 32. The translation logic 30, 32 translates core-specific memory transactions (such as reads and writes) into core-independent memory transactions that will appear on the bus 26 and that are comprehended by the shared cache 18 without regard for the type of core that initiated them. In FIG. 1C, much or all of the burden of dealing with characteristics of core-specific transactions shifts to the shared cache 18. Thus, the shared cache 18 includes shared cache translation logic (SC-TL) 40 to support handling of requests (and, more specifically, command set features) from the different processor core types in an appropriate way. The shared cache translation logic 40 is a superset of the logic needed to support each processor core type. The shared cache translation logic 40 may further include bus arbitration logic to prioritize bus access by processor core type. Even in the latter example (shown in FIG. 1C), there may be some issues that need to be reconciled closer to the cores themselves. For example, in CPU applications a cache typically uses addresses to determine memory type, but in NPU applications the cache may be instructed as to memory type by the NPU command. Also, the processor cores may require support for encoding transactions with a core identifier.

Figure 2:
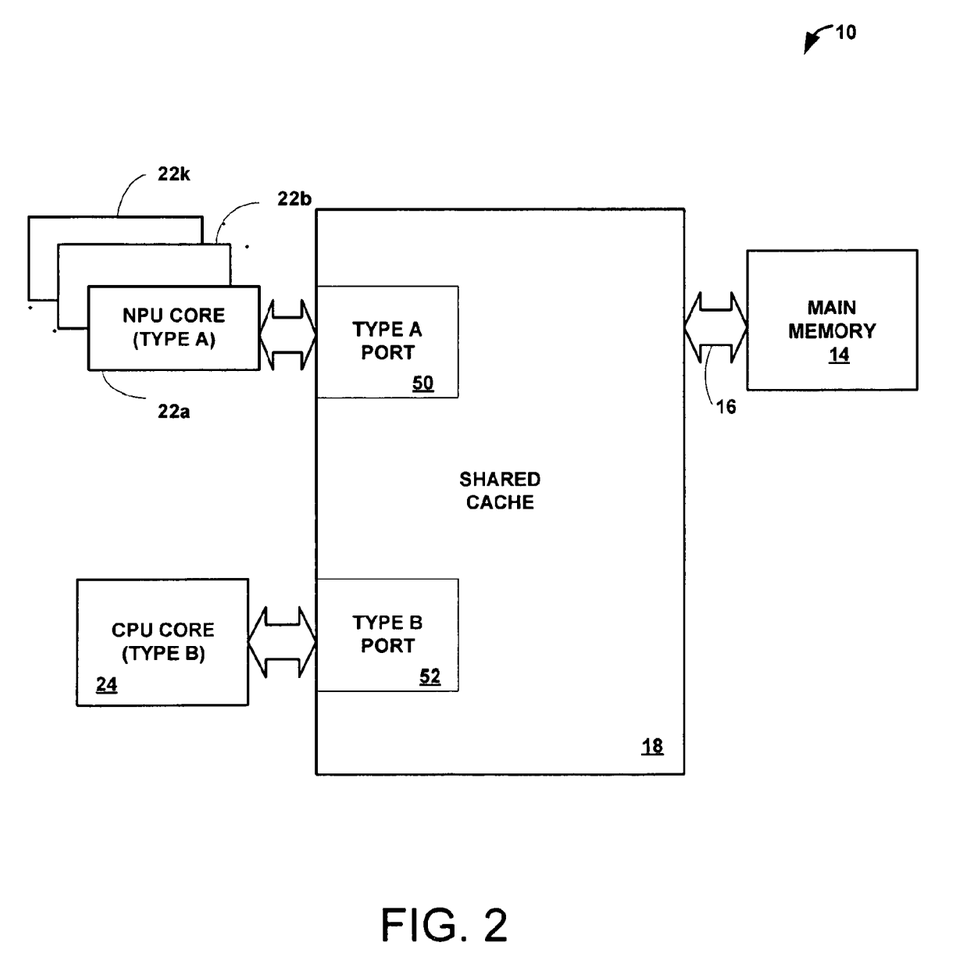
FIG. 2 shows an exemplary heterogeneous multi-core processor having a multi-ported shared cache architecture.

As mentioned earlier, other core-to-cache interconnect mechanisms are possible. For example, and as shown in FIG. 2, the cache 18 may be a multi-ported cache with a port for each core, or a single port for each processor core type. Thus, in the case of the NPU 22 and CPU 24 cores, and as shown in the figure, the NPU cores 20a, 20b, . . . , 20k connect to a port 50 of a first port type (shown as "type A") and the CPU core 24 uses a port 52 of a second port type (shown as "type B"). Although port 50 is shown as a shared port, it will be appreciated that each NPU core could be connected to a respective port 50 over a separate channel. In this approach, the type of core generating an access request would be known by the port through which the request was received. In a multi-ported architecture such as this, the ports of each type (that is, ports supporting the different processor core types) may be "tuned" for the traffic patterns and other characteristics or features (such as commands, sizes, alignments and so forth) of those different processor core types. For example, NPU cores are bandwidth sensitive whereas CPU cores are more latency sensitive. Data returned by the cache for NPU requests may be batched on return to optimize through-put for fixed overhead. The tuning may take into account the types of transactions to be performed by a specific core type. Certain types of cores may perform mostly reads (e.g., graphics engines) while other core types may perform a more balanced mix of reads and writes.

Figure 3:
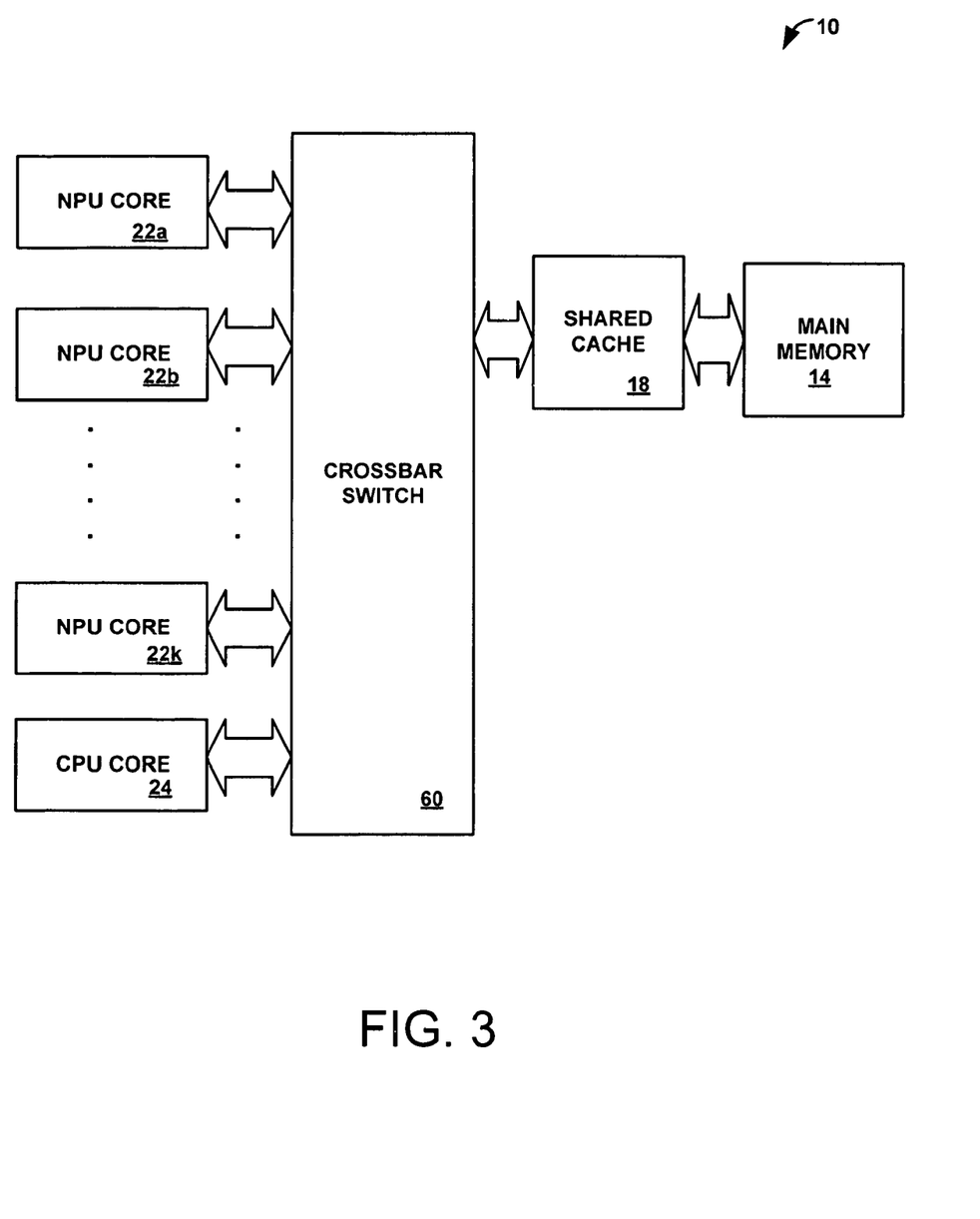
FIG. 3 shows an exemplary heterogeneous multi-core processor having a switch-based shared cache architecture.

FIG. 3 shows yet another interconnect approach. With this approach each of the cores is connected to the shared cache 18 by a switch 60 (e.g., a crossbar switch, as shown). The translation logic could be implemented in any one of the ways described above with respect to the bus-based approach.

Although not shown, the individual cores may include logic to support interrupts or flags for core-to-core signaling. Such inter-core signaling may be used when one core, such as the NPU core 22, has transferred work (e.g., in the form of packet data, pointers, state and so forth) to the shared cache 18 and needs to signal to a second core, such as the CPU core 24, that the work is available to be operated on by the second core.

Figure 4:
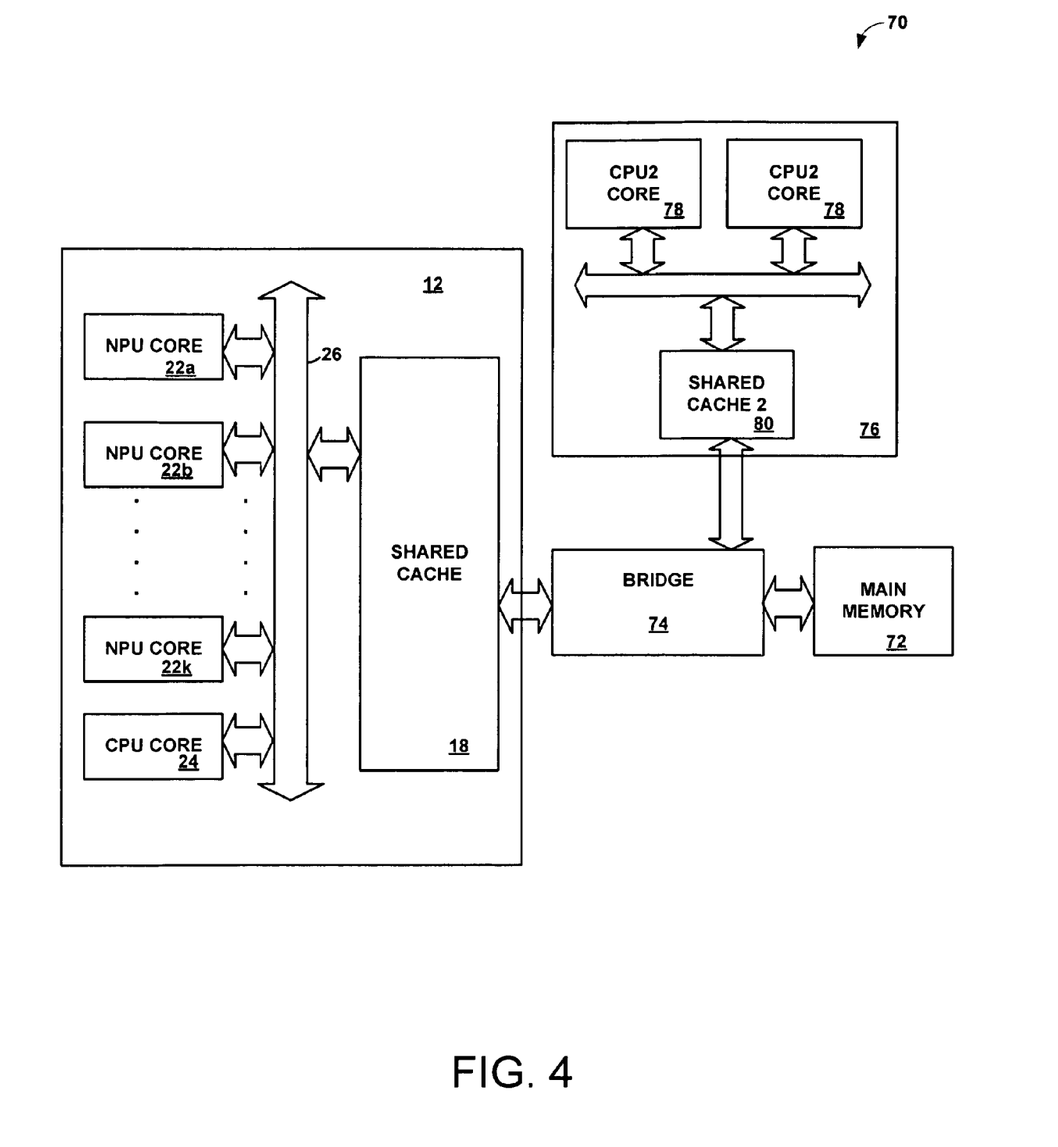
FIG. 4 shows an exemplary heterogeneous multi-core processor (with a shared cache) connected to a main memory of a multi-core general purpose processor by a bridge.

The processor 12 may participate as a unit in a cache coherent access to a main memory with one or more other processor/cache combinations, as shown in FIG. 4. Turning to FIG. 4, a system 70 includes the processor 12 now connected to a main memory 72 by a bridge 74. The main memory 72 is shared by a general purpose processor (GPP) 76, which is also connected to the bridge 74. The GPP 76 includes one or more CPU cores 78 behind a common (or shared) cache 80. The caches and bridge structure operates in a manner that ensures all of the caches are kept coherent.

The bridge 74 may be implemented to allow the cores of the processor 12 and the cores of GPP 76 to reference the main memory as well as the shared cache of the other processor with their own native access protocols. The shared cache organization enables the heterogeneous processor cores of the processor 12 to access the shared cache 18 in their native mode of operation, but with no impact resulting from other processor types (such as the CPU cores 78 of GPP 76) utilizing different protocols to access the shared cache 18. In one example implementation based on an IXA-based NPU core 22 and IA-based CPU core 78, the NPU core 22 may access the shared cache 18 via IXA protocols (such as Command Push/Pull bus protocols) and view the shared cache as another memory resource while external access to the shared cache 18 by one of the CPU cores 78 via the bridge 74 may be performed using IA cache access and coherency mechanisms. As noted earlier, the heterogeneous cores of the processor 12 are able to fully access the shared cache 18 using their native (and different) access protocols. Data can be passed from a core in one processor to a core in the other processor in a cache-to-cache transfer. This can be accomplished with lower latency and higher bandwidth than the alternative, a main memory write by one processor and a main memory read by the other, and does not load the main memory.

An example transfer is as follows. A CPU core 78 sends a read request to shared cache 80, which detects a cache miss and directs the read request to the bridge 74. The bridge 74 sends the read request to the shared cache 18, which contains a copy of the requested data. The shared cache 18 returns the requested data to the shared cache 80 via the bridge 74. In an alternative scenario, the bridge 74 may send the read request to both the shared cache 18 and the main memory 72, and decide which data copy to use based on the response from the shared cache 18.

The shared cache mechanism may support different cache policies and features, such as cache line alignment, cacheability and cache line locking. Cache line alignment converts a memory transaction that affects more than one shared cache cache line to multiple memory accesses that each fall within a single cache line. Cacheability of data involved in a memory transfer may be determined based on instruction type (e.g., an instruction that specifies a non-cached transaction) and/or based on memory type, e.g., as specified in a Memory Type Range Register (MTTR). With this feature at least one of the heterogeneous processor cores, e.g., the NPU core, is capable of generating reads and writes to the main memory 14 that bypass the shared cache 16 in the event of a cache miss. Cache line locking refers to the locking of individual cache lines by a core. With the cache line locking feature at least one of the heterogeneous processor cores can lock a portion (e.g., a single cache line, multiple cache lines, or all cache lines) of the shared cache lines for use as a private memory, possibly to extend local resources (such as scratch memory) already available to the core(s), or for extended private modification. By locking one, some or all of the cache lines, a core can utilize the locked memory space as extended local memory, while the cores continue coherent operation on any remaining portion of the shared cache. When only one of the heterogeneous processor cores is actively using the shared cache, that processor core receives the full benefit of the entire shared cache—effectively using the chip area to maximize performance. This cache locking may be implemented in the same manner as locking for atomic operations, e.g., using a cache line lock status field.

The utilization of one or more of these (and possibly other) techniques may be driven, at least in part, by the selection of core types. For example, some special purpose processors, such as network processors, include reads and writes to/from memory that the programmer knows to have very poor temporal and spatial locality The same may be true for some accesses by the general purpose processor. To improve the efficiency of these accesses, therefore, it may be desirable to provide memory read and write commands that do not result in cache activities. In other words, data is not placed in the cache, and does not evict other data already in the cache. Accesses that the programmer knows will not hit cache can be routed around that cache, increasing the cache hit rate for other accesses. Also, different core types may support different data fetch/transfer sizes, some of which may not be cache line aligned. CPU cores such as an IA core typically generate requests that fall within a single cache line, while an NPU such as an IXA network processor may have the capability to generate requests of arbitrary size and that may span multiple cache lines.

Figure 5:
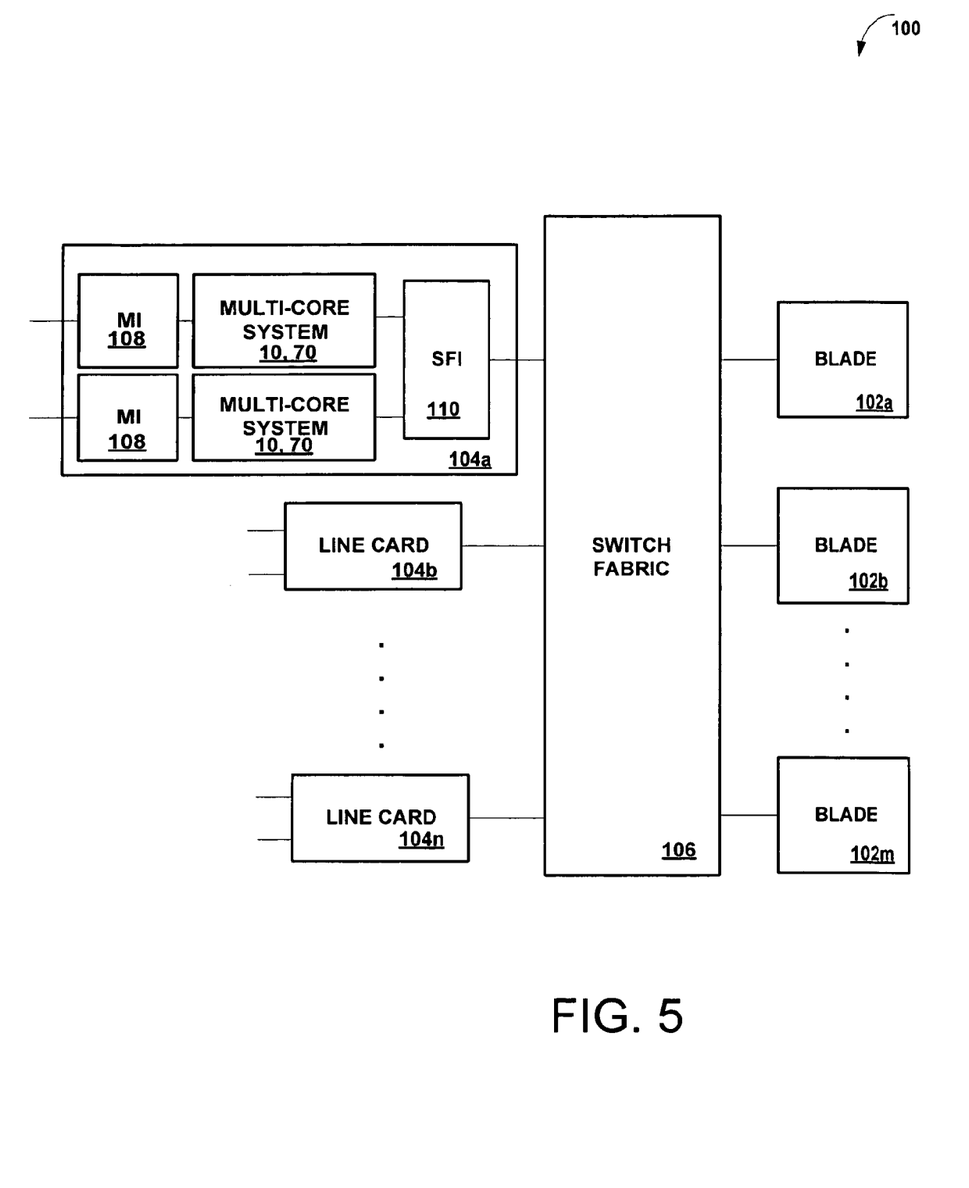
FIG. 5 shows an exemplary networking application in which a heterogeneous multi-core processing system such as those illustrated in FIGS. 1-4 is employed.

The shared cache architecture described herein allows two different types of processors to be placed behind the same cache. Such an architecture is likely to be required for high performance on workloads like graphics, streaming media and networking as design trends head towards multi-core processors. In networking applications, for example, it is possible to bring packet processing and general purpose processing closer together for optimal, high-throughput communication between packet processing elements of a network processor and the control and/or content processing of general purpose processors. For example, as shown in FIG. 5, a distributed processing platform 100 includes a collection of blades 102a-102m and line cards 104a-104n interconnected by a backplane 106, e.g., a switch fabric (as shown). The switch fabric, for example, may conform to Common Switch Interface (CSIX) or other fabric technologies such as Hyper-Transport, Infiniband, Peripheral Component Interconnect (PCI), Packet-Over-SONET, RapidIO, and/or Universal Test and Operations PHY Interface for ATM (UTOPIA).

The line card is where line termination and I/O processing occurs. It may include processing in the data plane (packet processing) as well as control plane processing to handle the management of policies for execution in the data plane. The blades 102a-102m may include: control blades to handle control plane functions not distributed to line cards; control blades to perform system management functions such as driver enumeration, route table management, global table management, network address translation and messaging to a control blade; applications and service blades; and content processing. In a network infrastructure, content processing may be used to handle intensive content-based processing outside the capabilities of the standard line card applications including voice processing, encryption offload and intrusion-detection where performance demands are high.

At least one of the line cards, e.g., line card 104a, is a specialized line card that is implemented based on the architecture of heterogeneous multi-core system 10 (or system 70), to more tightly couple the processing intelligence of CPU cores to the more specialized capabilities of NPU cores. The line card 104a includes media interfaces (MI) 108 to handle communications over network connections. Each media interface 108 is connected to a system 10 (or 70). In this implementation, one system is used as an ingress processor and the other system is used as an egress processor, although a single system could also be used. Each system 10 (or 70) is coupled to the switch fabric 106 via a switch fabric interface (SFI) 110. Alternatively, or in addition, other applications based on the multi-processor systems 10, 70 could be employed by the distributed processing platform 100. Depending on the configuration of blades and line cards, the distributed processing platform 100 could implement a switching device (e.g., switch or router), a server, a datacenter or other type of equipment.

Other embodiments are within the scope of the following claims.

What is claimed is:

1. A processor comprising:
   processor cores including heterogeneous processor cores, the heterogeneous processor cores comprising multiple central processing unit (CPU) cores; and
   a first cache connected to and shared by a first set of the processor cores;
   a second cache connected to and shared by a second set of the processor cores, the second cache being connected to the first cache;
   wherein at least the first set of processor cores and the first cache are integrated on a single integrated die; and
   wherein the first cache and second cache are kept coherent.

2. The processor of claim 1 wherein the heterogeneous processor cores comprises a special purpose processor core.

3. The processor of claim 2 wherein the special purpose processor core comprises a network processor unit (NPU) core having an instruction set that does not include an instruction for a floating point operation.

4. The processor of claim 2 wherein the special purpose processor core comprises a graphics engine core.

5. The processor of claim 1 wherein the heterogeneous processor cores comprises a NPU core and a CPU core.

6. The processor of claim 1 wherein the heterogeneous processor cores comprises a CPU core and a graphics engine core.

7. The processor of claim 1 wherein the first cache comprises a multi-ported cache.

8. The processor of claim 7 wherein the processor cores comprise one or more processor cores of a first type and one or more processor cores of a second type, and the multiported cache comprises at least one port to support transactions generated by the one or more processor cores of the first type and at least one port to support transactions generated by the one or more processor cores of the second type.

9. The processor of claim 8 wherein the ports are configured to operate based on the respective processor core types that the ports support.

10. The processor of claim 9 wherein the ports comprise ports configured based on one or more of: command types, sizes, and alignments of the respective processor core types.

11. The processor of claim 9 wherein the heterogeneous processor cores comprise processor cores of different types and, and the multiported cache provides a different port type for each different type of processor core.

12. The processor of claim 1 further comprising an interconnect that couples the first cache to the second cache, the interconnect comprising an interconnect bus.

13. The processor of claim 1 wherein the processor cores include translation logic to translate transactions specific to each processor core to core-independent transactions.

14. The processor claim 1 wherein the heterogeneous processor cores comprise different types of processor cores and the first cache includes logic to handle transactions generated by the different types of processor cores.

15. The processor of claim 1 wherein the heterogeneous processor cores use commands that allow different maximum transfer sizes, where one of the different maximum transfer sizes allows transfers that span multiple cache lines.

16. The processor of claim 1 wherein at least one of the heterogeneous processor cores is operable to lock a portion of the first cache for extended private modification.

17. The processor of claim 1 wherein each processor core is capable of using the shared cache to pass data to another processor core.

18. The processor of claim 1, wherein the processor operates such that a cache miss in the first cache causes a read request to be issued to the second cache.

19. The processor of claim 18, wherein the processor system operates such that a cache miss in the first cache also causes a read request to be issued to main memory.

20. A system comprising the processor of claim 1, and further comprising a switch fabric interface.

21. The processor of claim 1, wherein the first cache comprises an L2 cache.

22. The processor of claim 1, wherein all the processor cores in the second set of the processor cores are not heterogeneous.

23. A server system, comprising:
   a processor comprising:
      processor cores including heterogeneous processor cores, the heterogeneous processor cores comprising multiple central processing unit (CPU) cores; and
      a first cache connected to and shared by a first set of the processor cores;
      a second cache connected to and shared by a second set of the processor cores, the second cache being connected to the first cache;
      wherein at least the first set of processor cores and the first cache are integrated on a single integrated die; and
      wherein the first cache and second cache are kept coherent; and
   a switch fabric coupled to the processor.

24. The server system of claim 23, wherein all the processor cores in the second set of the processor cores are not heterogeneous.

* * * * *